June 17, 1958  W. C. PIERCE ET AL  2,839,697
MAGNETIC TORQUE PRODUCING DEVICE
Filed Dec. 8, 1953
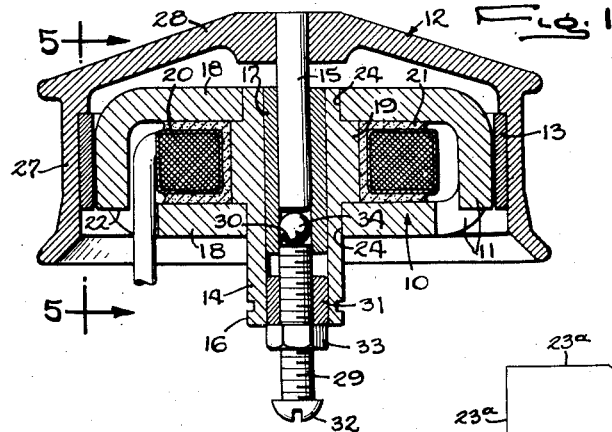
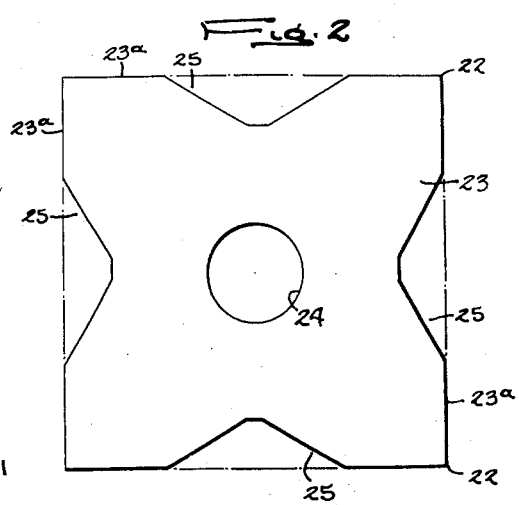
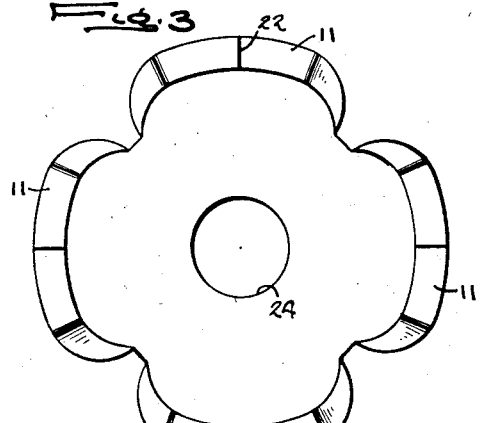
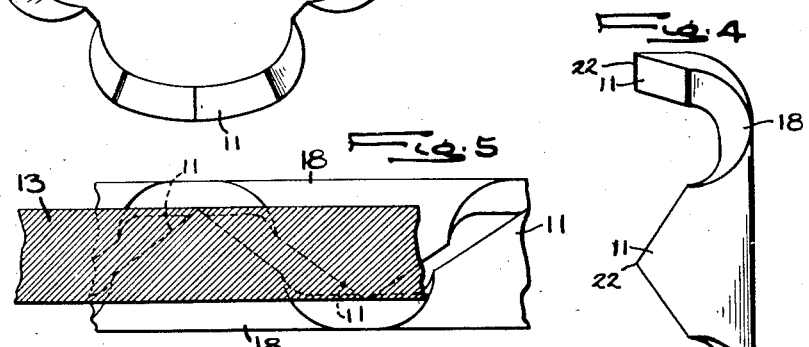
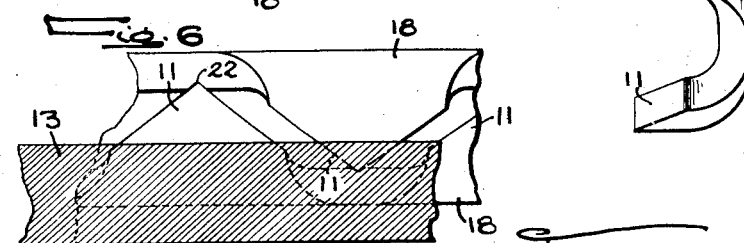
INVENTORS
William C. Pierce
Paul A. Harter
ATTORNEYS United States Patent Office 2,839,697
Patented June 17, 1958

2,839,697

MAGNETIC TORQUE PRODUCING DEVICE

William C. Pierce and Paul A. Harter, Beloit, Wis., assignors to Warner Electric Brake & Clutch Company, South Beloit, Ill., a corporation of Illinois Application December 8, 1953, Serial No. 396,866

6 Claims. (Cl. 310—93)

This invention relates generally to magnetic torque producing devices and, more particularly, to such devices of the hysteresis or eddy current type comprising relatively rotatable field and armature members having coacting concentric faces opposed to each other and overlapping axially.

One object of the invention is to provide a torque device of the above character in which the armature and field member are mounted in a novel manner for relative axial shifting movement to vary the magnetic coupling between the two by changing the area of overlapping between the opposed concentric faces thereof.

A more detailed object is to secure the coacting magnetic members to two relatively rotatable telescoping elements which are shiftable axially relative to each other by an adjustable abutment disposed within the outer element and engageable with one end of the inner element.

The invention also resides in the novel construction of the field member to conserve material.

Other objects and advantages of the invention will become apparent from the following detailed description taken in connection with the accompanying drawings, in which—

Figure 1 is a diametrical sectional view of a torque device embodying the novel features of the present invention.

Fig. 2 is a face view of a blank from which one of the parts is formed.

Fig. 3 is a view similar to Fig. 2 of the completed part.

Fig. 4 is a side view of the part shown in Fig. 3.

Fig. 5 is a sectional view taken along the line 5—5 of Fig. 1.

Fig. 6 is a view similar to Fig. 5 showing the parts in different positions.

In the drawings, the invention is shown for purposes of illustration embodied in a torque producing device of the hysteresis or eddy current type which comprises generally a field member 10 having an annular series of angularly spaced pole pieces 11 and a relatively rotatable armature member 12 including a cylindrical inductor ring 13 of magnetic material closely encircling and concentric with the pole pieces. Supporting the field and armature members 10 and 12 for relative rotation are a sleeve 14 secured to one of the members and a shaft 15 having one end portion telescoping with one end portion of the sleeve and its other end portion secured to the other member. In the present instance, the field member 10 is carried by the sleeve 14 and the latter is stationarily supported with its axis disposed vertically by suitable means (not shown) secured to its lower end portion 16 which projects downwardly beyond the field member. A cylindrical bearing 17 pressed into the upper end portion of the sleeve rotatably receives the lower end portion of the shaft.

The pole pieces 11 project axially from and, in this instance, are formed integral with the outer peripheries of two flat parallel disks or rings 18 of magnetic material having central apertures 24 to receive the sleeve 14 with a tight press fit and spaced apart axially on the upper end portion of the sleeve by a circumferential rib 19 abutting the adjacent inner sides of the disks. Each pole piece of each disk extends axially toward the other disk and overlaps adjacent pole pieces of the latter both radially and axially. Adjacent ones of the pole pieces in the annular series are polarized oppositely in the present instance by energization of a multiple turn coil 20 concentric with the sleeve and secured in a centered position between the disks by a suitable cement 21.

In one of its aspects, the present invention contemplates a novel construction of the disks 18 and the pole pieces 11 thereof to conserve material and thereby reduce manufacturing costs. To this end, each pole piece is tapered substantially to a point on its outer projecting end 22 and the number of pole pieces for each disk is made equal to the number of corners of a flat piece or blank 23 (Fig. 2) of sheet metal of regular polygonal shape whose side edges 23a converge at the corners to define interior angles of a maximum of approximately 90 degrees. With such a blank, each corner portion thereof constitutes a pole piece, the side edges 23a of the blanks constituting the tapered ends 22 of the pole pieces. Of the two regular polygons having interior corner angles of 90 degrees or less, a triangle and a square, it is preferred to use the latter (shown in dotted outline in Fig. 2) and thereby provide a maximum of four pole pieces on each disk.

In the formation of a disk 18 from a square blank 23, the latter is subjected to a stamping operation in which a triangular portion is cut from the blank along each side edge and between adjacent corners thereof to form a recess 25 and corner portions radiating from the center of the blank. Then, these corner portions are bent in the same direction and substantially at right angles to the blank to form the pole pieces 11. As an incident to this bending operation, each pole piece also is curved about the axis of the disk as shown in Fig. 3 so that its outer radially facing pole face 26 lies on a cylinder of revolution concentric with the axis, this surface preferably being machined for accuracy after the bending operation. In addition to facilitating formation of the disks and pole pieces from a square or triangular blank, the tapering of the projecting end of each pole piece provides a substantially constant flux density in all portions of the pole piece.

To secure the cylindrical inductor ring 13 on the shaft 15, the ring, in this instance, is pressed into a generally cylindrical pulley 27 concentric with the shaft and having an apertured end wall 28 fast on the projecting upper end portion of the shaft 15. While the pulley may be made of a magnetic material, it is formed herein by molding a suitable thermosetting resin.

In accordance with another aspect of the present invention, the field and armature members 10 and 12 are shifted axially relative to each other in a novel manner to change the extent of axial overlap of the pole faces 26 and the opposed concentric face of the inductor ring 13 and thereby vary the torque output of the coupling. This is accomplished without increasing the axial length of the sleeve 14 through the provision of an element 29 which projects into the lower end portion 16 of the sleeve 14 and presents an axially facing abutment 30 (Fig. 1) cooperating with the projecting end of the shaft 15 to limit inward movement of the latter relative to the sleeve. Such movement of the shaft is limited to various selected positions by means on the sleeve and the abutment element 29 which coact to permit axial adjustment of the latter and to hold the same in the selected position after adjustment thereof.

The abutment 30 in this instance is the inner end of a screw which constitutes the abutment element 29 and whose external threads mate with the internal threads of a nut 31 pressed into and forming a part of the lower end portion 16 of the sleeve 14 and coacting with the screw for axial adjustment of the latter relative to the sleeve. The head 32 of the screw is disposed exteriorly of the sleeve and therefore is accessible to facilitate axial adjustment of the abutment 30. A lock nut 33 threaded on the screw 29 may be tightened against the outer end of the nut 31 to hold the screw against turning relative to the sleeve. While the abutment 30 may engage the inner end of the shaft directlly, it is preferred that the abutment act on the shaft end indirectly by interposing a ball bearing 34 between the two as shown to reduce the friction between the parts, the ball bearing being disposed within the cylindrical bearing 17. Such location of the ball bearing and of the inner end portion of the screw within the sleeve 14 and the cylindrical bearing 17 is made possible without increasing the axial length of the sleeve by extending the shaft 15 only partially through the sleeve.

With the axis of the sleeve 14 disposed vertically, the shaft 15 will be yieldably urged downwardly by the weight of the inductor ring 13 and the pulley 27 into engagement with the ball 34 whose axial position in the sleeve is determined by the position of the abutment 30 on the adjusting screw 29. When the latter is retracted and the ball 34 is in an inner or lower position in the sleeve 14 as shown in Fig. 1, the inner cylindrical surface of the inductor ring 13 overlaps substantially the full area of the pole faces 26 as shown in Fig. 5 to provide maximum torque output between the armature and field members for a given current flowing in the coil. To reduce this torque, the lock nut 33 is loosened and the screw 29 is advanced axially and upwardly in the sleeve to shift the abutment 30, ball 34, the shaft 15 and the inductor ring 13 axially to uncover a portion of the pole faces 26 as shown in Fig. 6, the lock nut 33 then being tightened against the nut 31 to retain the adjustment.

From the foregoing, it will be apparent that the relative axial positions of the armature and field members 12 and 10 may be shifted easily even while the pulley 27 is rotating because the screw 29 and its supporting sleeve are stationary and the screw head 32 is easily accessible on the exterior of the sleeve. Such variation of the torque output of the device by varying the extent of axial overlap between the pole faces 26 and inductor ring 13 makes possible the energization of a plurality of such devices from a single power source and the adjustment of the torque output of the devices individually without the necessity of rheostats or other means for varying the energization of the devices. By forming each disk 18 and its pole pieces 11 from the square blank 23 and utilizing the corner portions of the latter as the pole pieces, the tapered outer ends of the pole pieces are shaped as an incident to formation of the blank thus simplifying the stamping operations required as well as reducing the amount of material used.

We claim as our invention:

1. In a magnetic torque producing device, the combination of a sleeve, a rotary shaft having one end portion journaled in and slidable axially relative to one end portion of said sleeve, a magnetic coupling comprising relatively rotatable elements fast on said sleeve and the other end portion of said shaft respectively and having opposed concentric faces overlapping each other by varying amounts according to the relative axial positions of said sleeve and shaft whereby to determine the torque output of the coupling, an elongated member having one end portion projecting into the other end of said sleeve and providing an abutment on its inner end coacting with the inner end of said shaft to limit the inward movement of the latter and thereby determine the extent of overlapping of said magnetic faces, and threads on said sleeve and said member respectively coacting with each other to hold said abutment in various selected positions of adjustment within the sleeve and provide different amounts of overlap of said faces, the other end portion of said member projecting exteriorly of said sleeve where it is easily accessible for turning the member and shifting the axial position thereof relative to the sleeve.

2. In a magnetic torque producing device, the combination of a sleeve adapted to be supported stationarily, a rotary shaft having one end portion journaled in and slidable axially relative to said sleeve, a magnetic coupling comprising a stationary element and a relatively rotatable element fast on said sleeve and said shaft respectively and having opposed concentric faces overlapping each other by varying amounts according to the relative axial positions of said sleeve and shaft whereby to determine the torque output of the coupling, a member having one end portion projecting into the other end of said sleeve and providing an abutment coacting with the inner end of said shaft to limit the inward movement of the latter and thereby determine the extent of overlapping of said magnetic faces, and means on said sleeve and member respectively coacting with each other to hold said abutment in various selected positions of adjustment within the sleeve and provide different amounts of overlap of said faces and including a part located exteriorly of the sleeve to facilitate adjustment of the axial position of the member relative to the sleeve during rotation of said shaft.

3. In a magnetic torque producing device, the combination of, a sleeve, a rotary shaft having one end portion journaled in and slidable axially relative to said sleeve, a magnetic coupling comprising relatively rotatable elements respectively fast on said sleeve and carried by but fixed against movement axially relative to said shaft, said elements having opposed concentric faces overlapping each other by varying amounts according to the relative axial positions of said sleeve and shaft whereby to determine the torque output of the coupling, a member projecting into the other end of said sleeve and providing an abutment coacting with the inner end of said shaft to limit the inward movement of the latter and thereby determine the extent of overlapping of said magnetic faces, and means on said sleeve and member respectively coacting with each other to hold said abutment in various selected positions of adjustment within the sleeve and provide different amounts of axial overlap of said faces.

4. A magnetic torque producing device, a field member comprising a pair of flat disks of magnetic material secured together in laterally spaced parallel relation and each having four angularly spaced pole pieces coacting with the pole pieces of the other disk to form an annular series and each projecting axially from the outer periphery of its supporting disk toward the other disk and in between adjacent pole pieces of the latter, each of said pole pieces tapering axially to a point at its outer projecting end and each of said disks comprising a flat blank of sheet metal of generally square shape having corner portions bent laterally and at right angles to the blank to constitute the tapered pole pieces.

5. In a magnetic torque producing device, a field member comprising a pair of disks of magnetic material secured together in laterally spaced relation and each having a plurality of angularly spaced pole pieces coacting with the pole pieces of the other disk to form an annular series and each projecting integrally and axially from the outer periphery of its supporting disk toward the other disk and in between adjacent pole pieces of the latter, each of said pole pieces tapering axially substantially to a point at its outer projecting end and each of said disks comprising a flat blank of sheet metal of generally square shape having substantially right angular corner portions bent laterally and at approximately right angles to the blank to constitute the pole pieces.

6. In a magnetic torque producing device, a field member comprising a pair of disks of magnetic material secured together in laterally spaced relation and each having a plurality of angularly spaced pole pieces coacting with the pole pieces of the other disk to form an annular series and each projecting axially from the outer periphery of its supporting disk toward the other disk and in between adjacent pole pieces of the latter, each of said pole pieces tapering axially at its outer projecting end and each of said disks comprising a flat blank of sheet metal of regular polygonal shape having a maximum of four sides and corner portions bent laterally and at substantially right angles to the blank to constitute the tapered pole pieces.

References Cited in the file of this patent

UNITED STATES PATENTS

| | | |
|---|---|---|
| 1,903,832 | Nichols | Apr. 18, 1933 |
| 2,334,157 | Morath | Nov. 9, 1943 |
| 2,492,776 | Winther | Dec. 27, 1949 |
| 2,529,481 | Brewer | Nov. 14, 1950 |

FOREIGN PATENTS

| | | |
|---|---|---|
| 917,090 | France | Sept. 2, 1946 |
| 927,743 | France | May 12, 1947 |